United States Patent
Shih (10) Patent No.: US 10,480,562 B2
(45) Date of Patent: Nov. 19, 2019

(54) SELF-TAPPING SCREW HEAD STRUCTURE

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

( * ) Notice: Subject to any disclaimer, the term of this patent is extended or adjusted under 35 U.S.C. 154(b) by 171 days.

(21) Appl. No.: 15/846,918

(22) Filed: Dec. 19, 2017

(65) Prior Publication Data

US 2019/0186527 A1 Jun. 20, 2019

(51) Int. Cl.
*F16B 23/00* (2006.01)
*F16B 25/10* (2006.01)
*F16B 25/00* (2006.01)

(52) U.S. Cl.
CPC ........ *F16B 25/103* (2013.01); *F16B 25/0015* (2013.01); *F16B 25/0063* (2013.01)

(58) Field of Classification Search
CPC .............................. F16B 25/103; F16B 35/065
USPC ......................................................... 411/399
See application file for complete search history.

(56) References Cited

U.S. PATENT DOCUMENTS

| 465,101 | A | * | 12/1891 | Richards | |
|---|---|---|---|---|---|
| 3,903,784 | A | * | 9/1975 | Dekker | F16B 35/065 411/399 |
| 5,203,657 | A | * | 4/1993 | Nagoshi | F16B 35/065 411/188 |
| 5,249,882 | A | * | 10/1993 | Nagoshi | F16B 35/065 411/386 |
| 5,683,217 | A | * | 11/1997 | Walther | F16B 35/06 411/399 |
| 6,290,444 | B1 | * | 9/2001 | Dicke | F16B 35/065 411/188 |
| 6,394,725 | B1 | * | 5/2002 | Dicke | F16B 35/065 411/188 |
| 2005/0226701 | A1 | * | 10/2005 | Craven | F16B 35/048 411/399 |
| 2010/0143070 | A1 | * | 6/2010 | Hettich | F16B 35/065 411/399 |
| 2010/0158634 | A1 | * | 6/2010 | Walther | F16B 25/0015 411/399 |
| 2014/0178149 | A1 | * | 6/2014 | Su | F16B 35/065 411/399 |

(Continued)

FOREIGN PATENT DOCUMENTS

TW I496997 B 8/2015

*Primary Examiner* — Gary W Estremsky
(74) *Attorney, Agent, or Firm* — Muncy, Geissler, Olds & Lowe, P.C.

(57) ABSTRACT

A self-tapping screw head structure includes a screw head, a rod, a cone and a thread. A direction of the thread surrounding the cone and the rod determines a tapping direction. The screw head includes a top portion, a first neck portion connected to the top portion and having a circumference decreasing towards away from the top portion, a plurality of recesses recessed at a surface of the first neck portion, and a second neck portion connected to the first neck portion and having a circumference gradually decreasing towards away from the first neck portion. Each of the plurality of recesses includes a cutting end, a crumb guiding end away from the cutting end, a first accommodating groove and a second accommodating groove. A recess depth of the first accommodating groove is greater than that of the second accommodating groove.

7 Claims, 7 Drawing Sheets

(56) References Cited

U.S. PATENT DOCUMENTS

2016/0290382 A1\* 10/2016 Dill .................. F16B 35/065
2017/0016468 A1\* 1/2017 Lin .................. F16B 25/0015

\* cited by examiner

SELF-TAPPING SCREW HEAD STRUCTURE

FIELD OF THE INVENTION

The present invention relates to a self-tapping screw head structure, and particularly to a self-tapping screw head structure capable of preventing material cracking after fastening.

BACKGROUND OF THE INVENTION

The width of a conventional self-tapping screw head is usually wider than that of a screw rod, and forms a shape similar to a funnel. Thus, when the screw is fastened into an object, the screw head is pressed tightly against a drill hole to achieve a tight binding effect. However, for wood having high rigidity, rotating the screw thereinto can be effort-consuming, and wood crumbs produced during the process of rotating the screw cannot be effectively discharged. As a result, compression is caused when the residual wood crumbs in the wood receive the force from the screw being rotated into the wood, easily causing cracking and damaging of the wood.

For example, the Taiwan Patent No. I496997 provides a screw capable of accommodating wood crumbs. A plurality of outwardly protruding auxiliary blocks are provided on a lower surface of a screw head, and an accommodating region is formed between two adjacent of the auxiliary blocks. Each of the auxiliary blocks has one wall surface located at one side of the accommodating region and extending upwards from the lower surface, an upholding wall formed by the other side of the wall surface connecting towards another adjacent accommodating region, and a cutting blade formed and connected at the wall surface and the upholding wall. The fastening member can be cut when fastening and entering a fastened object, and crumbs can be accommodated in the accommodating regions, generating effectiveness of tight binding. However, in an actual application of the above screw, issues of expanded edges of an object and cracking open of screw holes are easily resulted. Therefore, there is a need for a solution that resolves issues of the prior art.

SUMMARY OF THE INVENTION

It is an object of the present invention to resolve issues of a conventional screw, which cannot effectively discharge crumbs and disperse a pressure between an object and the screw.

To achieve the above object, the present invention provides a self-tapping screw head structure. The self-tapping screw head structure includes a screw head, a rod connected to the screw head, a cone connected to one end of the rod away from the screw head, and a thread extending from the cone to the rod. A direction of the thread surrounding the cone and the rod determines a tapping direction surrounding the screw head and forming a circumferential path. The self-tapping screw head structure is characterized in that, the screw head includes a top portion, a first neck portion connected to the top portion and having a circumference gradually decreasing towards away from the top portion, a plurality of recesses recessing from a surface of the first neck portion and having recess depths gradually decreasing along the tapping direction, and a second neck portion connected to the first neck portion and having a circumference gradually decreasing towards away from the first neck portion. Each of the plurality of recesses includes a crumb guiding end located at a position with a smallest of the recess depths, a cutting end away from the crumb guiding end and having the smallest of the recess depths, a first accommodating groove located between the cutting end and the crumb guiding end and adjacent to the top portion, and a second accommodating groove located between the cutting end and the crumb guiding end, adjacent to the first accommodating groove and away from the top portion. The recess depth of the first accommodating groove is greater than that of the second accommodating groove.

Further, a first plane is formed at a bottom portion of the first accommodating groove, a second plane is formed at a bottom portion of the second accommodating groove, and an obtuse angle is included between the first plane and the second plane.

Further, each of the plurality of recesses includes a third accommodating groove located between the cutting end and the crumb guiding end, adjacent to the second accommodating groove and away from the first accommodating groove. The recess depth of the second accommodating groove is greater than that of the third accommodating groove.

Further, a third plane is formed at a bottom portion of the third accommodating groove. An obtuse angle is included between the third plane and the second plane.

Further, a decreasing rate of the circumference of the first neck portion is greater than that of the circumference of the second neck portion.

Further, the length of the first neck portion is longer than that of the second neck portion.

Further, parts of the cutting end and the crumb guiding end corresponding to the first accommodating groove are shifted towards the tapping direction.

Thus, the present invention provides following effects compared to the prior art.

During the tapping process of the present invention, the second neck portion having the smaller circumference first comes into contact with an object, followed by the first neck portion having the larger circumference, thus preventing the impedance caused by the working process and reducing the probability of cracking and damaging a drill hole. Further, the plurality of recesses are capable of accommodating and discharging wood crumbs and thus eliminating obstruction against the tapping and fastening process. After the tapping and fastening process is completed, wood crumbs are accommodated in the accommodating grooves, increasing the binding force with object and achieving secure fastening.

DETAILED DESCRIPTION OF THE PREFERRED EMBODIMENTS

Figure 3A:
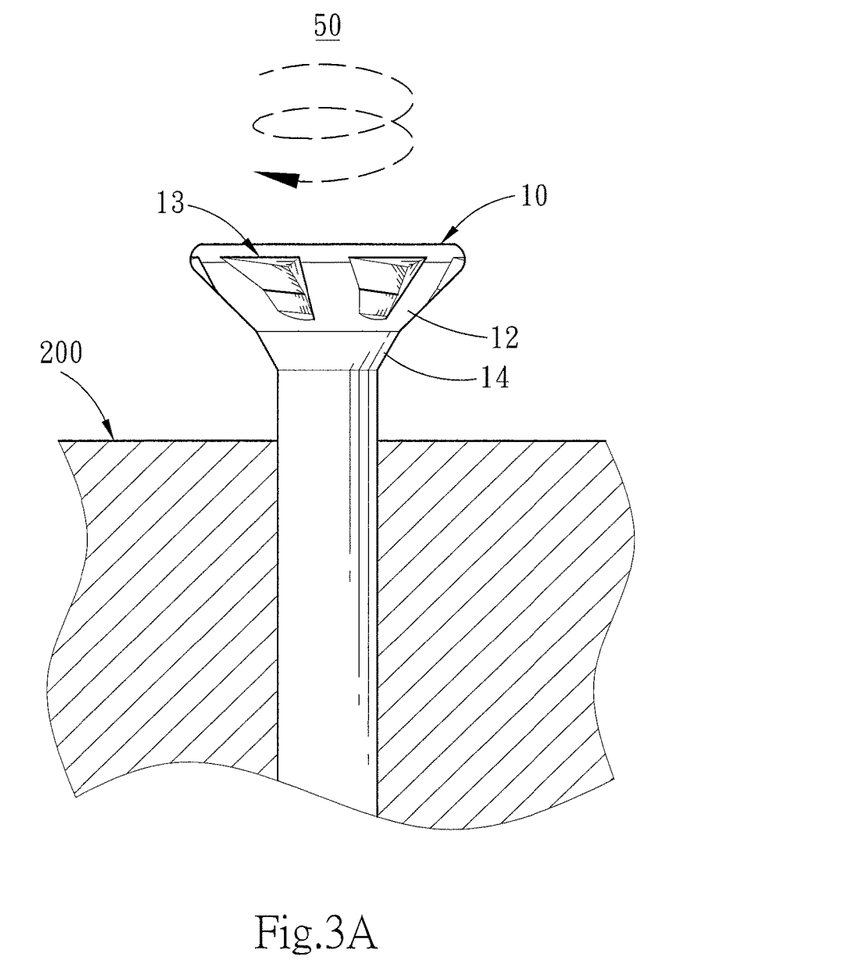
FIG. 3A to FIG. 3C are continuous operation schematic diagrams according to the first embodiment of the present invention.

Technical details of the present invention are given with reference to FIG. 1A, FIG. 1B, FIG. 1C and FIG. 1D below. The present invention provides a self-tapping screw head structure 100 for tapping and fastening an object 200 that does not require a drill hole provided in advance, wherein the object 200 is made of wood or plastic, for example. The self-tapping screw head structure 100 includes a screw head 10, a rod 20 connected to the screw head 10, a cone 30 connected to one end of the rod 20 away from the screw head 10, and a thread 40 extending from the cone 30 to the rod 20. A direction of the thread 40 surrounding the cone 30 and the rod 20 determines a tapping direction 50, which surrounds the screw head 10 and forms a circumferential path. Referring to FIG. 3A for the technical term "the tapping direction 50" of the present invention, an operation groove of the screw head 10 can be placed with a screw driver (not shown), and is rotated from the right to the left of the drawing, so as to drill and move the entire screw into the object 200 at the lower part of the diagram. In the FIG. 3A, the rotation direction (from the right to the left of the drawing) of the screw head 10 is the tapping direction 50 of the present invention.

Figure 1A:
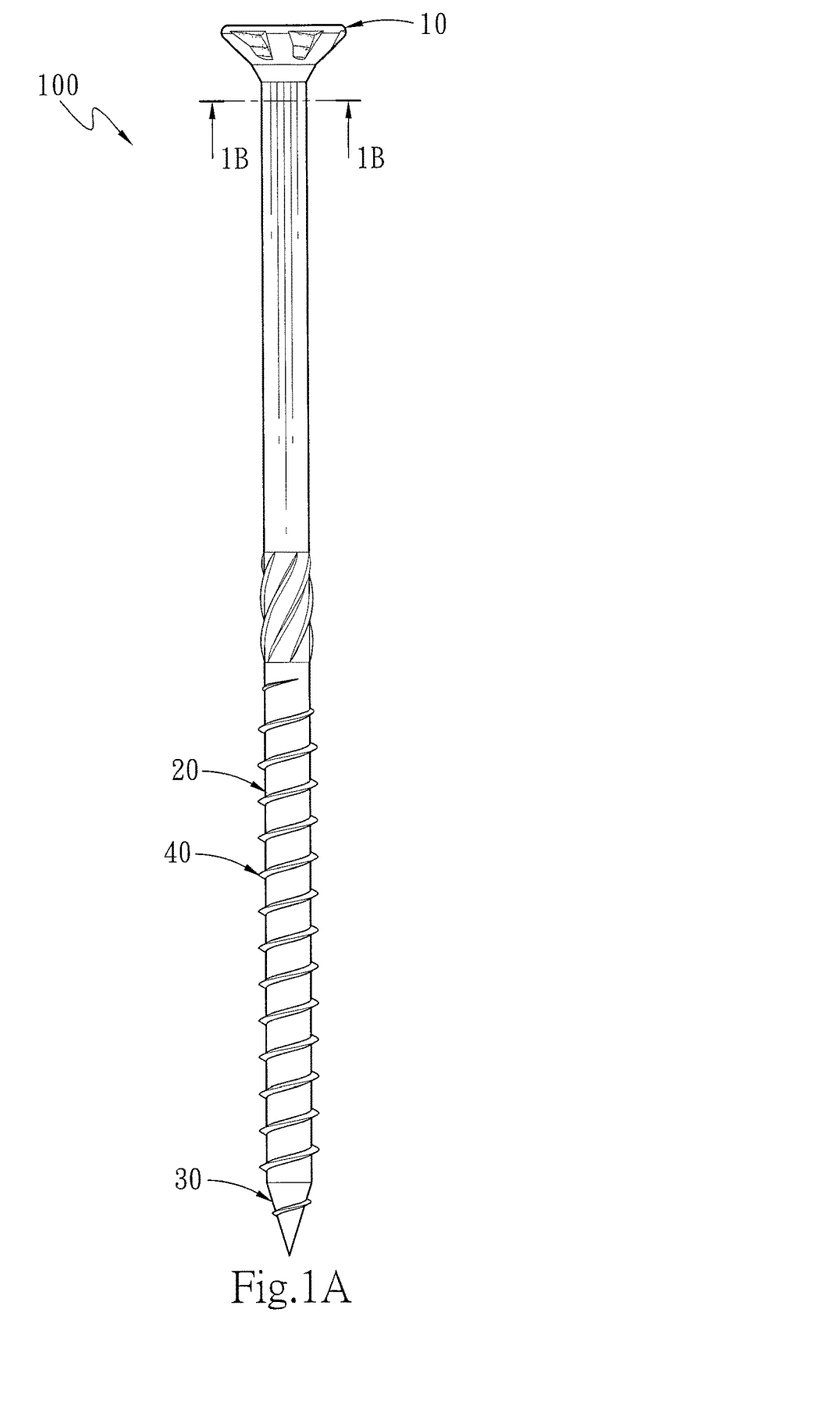
FIG. 1A is a planar view according to a first embodiment of the present invention.
Figure 1B:
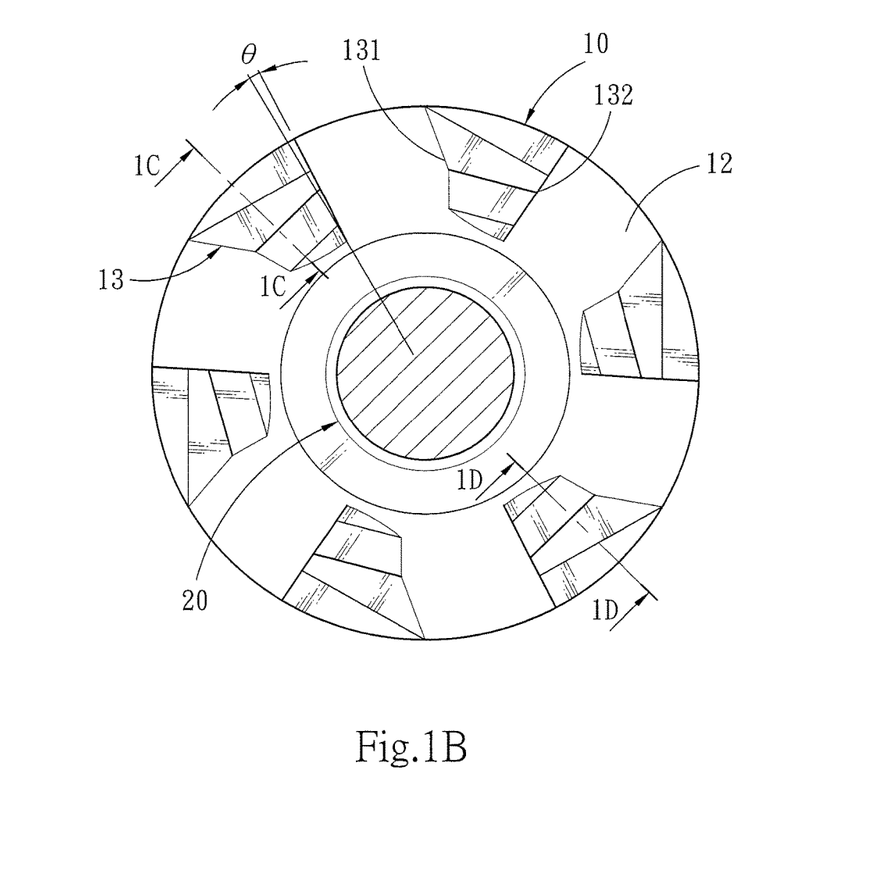
FIG. 1B is a section view of FIG. 1A at a position along 1B-1B.
Figure 1C:
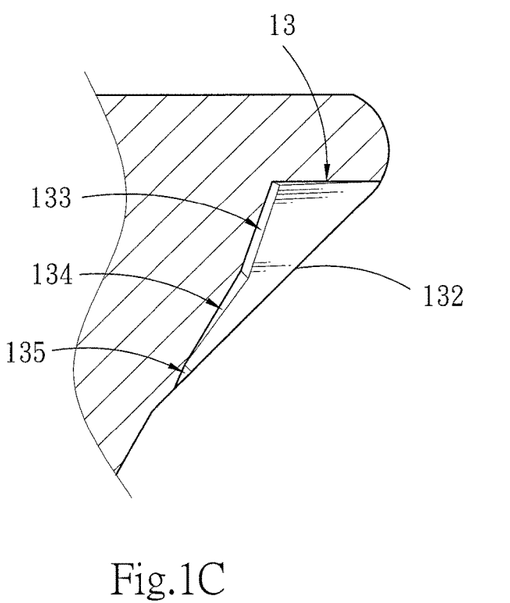
FIG. 1C is a section view of FIG. 1B at a position along 1C-1C.
Figure 1D:
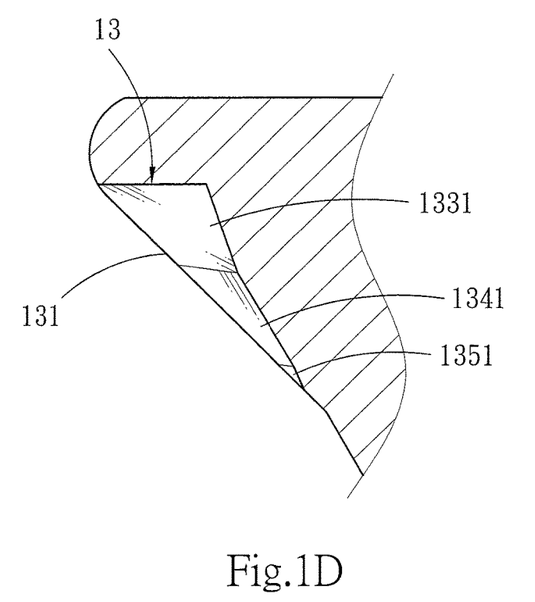
FIG. 1D is a section view of FIG. 1B at a position along 1D-1D.
Figure 2A:
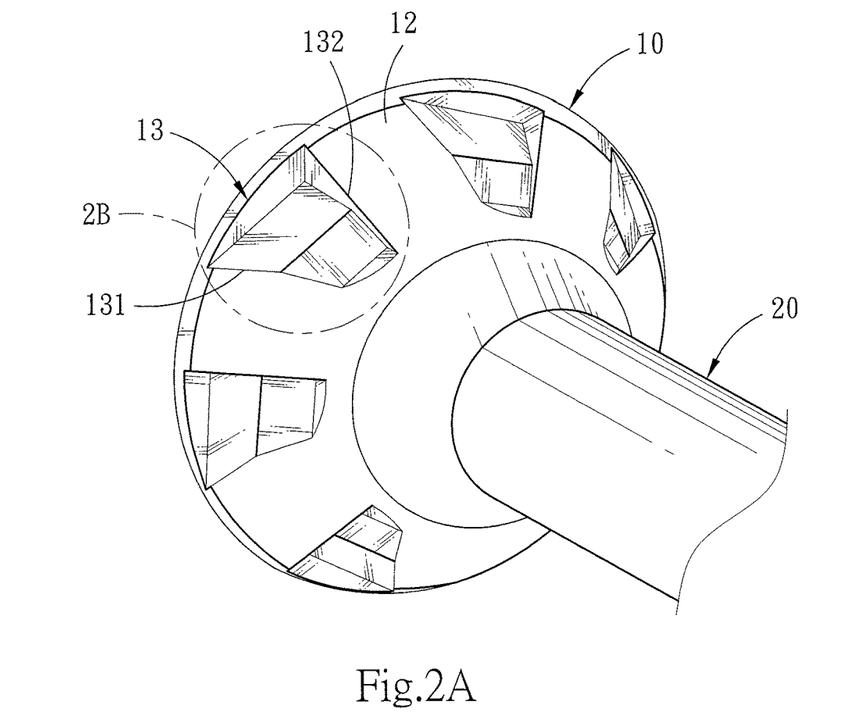
FIG. 2A is a perspective view of a screw head of the present invention.
Figure 2B:
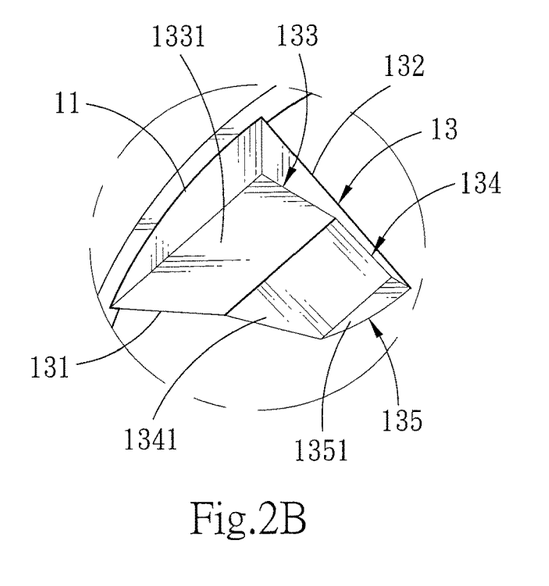
FIG. 2B is a partial enlarged view of a screw head of the present invention.

More specifically, referring to FIG. 2A and FIG. 2B, the screw head 10 includes a top portion 11, a first neck portion 12 connected to the top portion 11 and having a circumference gradually decreasing towards away from the top portion 11, a plurality of recesses 13 recessed at a surface of the first neck portion 12 and having recess depths gradually decreasing along the tapping direction 50, and a second neck portion 14 connected to the first neck portion 12 and having a circumference gradually decreasing towards away from the first neck portion 12. Further, a decreasing rate of the circumference of the first neck portion 12 is greater than that of the circumference of the second neck portion 14, and the length of the first neck portion 12 is longer than that of the second neck portion 14. Thus, during the tapping process, the second neck portion 14 having the smaller circumference first comes into contact with and presses against the object 200, and the first neck portion 12 having the greater circumference then follows, preventing excessively large impedance caused by the working process and reducing the probability of cracking and damaging a drill hole.

Figure 3B:
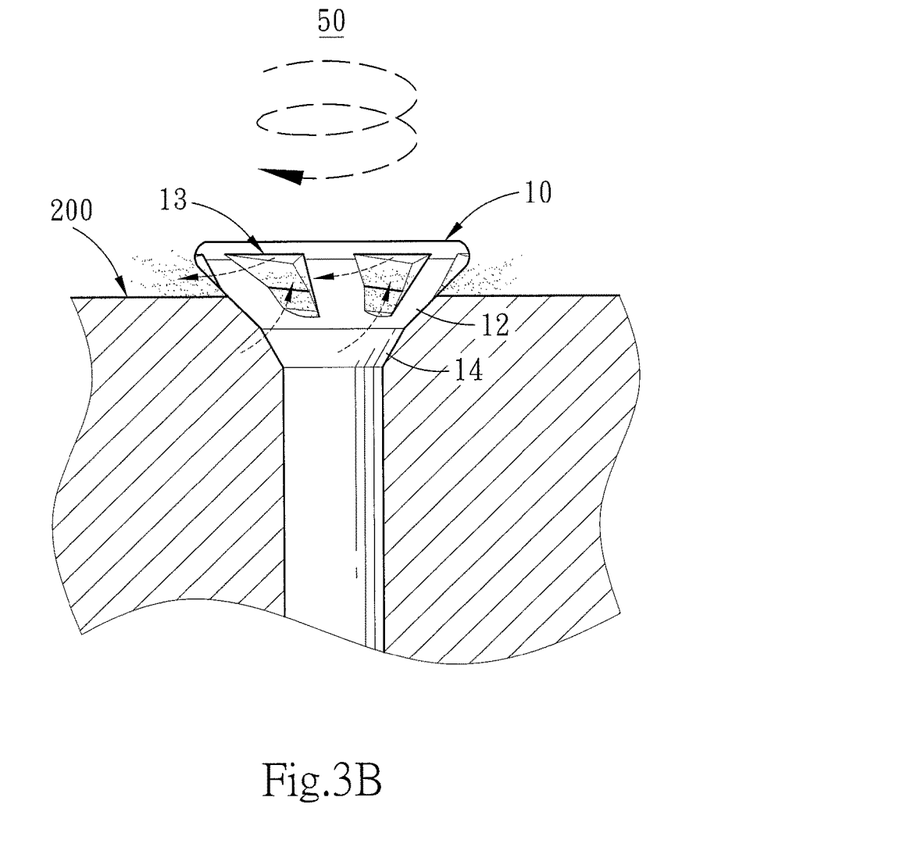
Figure 3C:
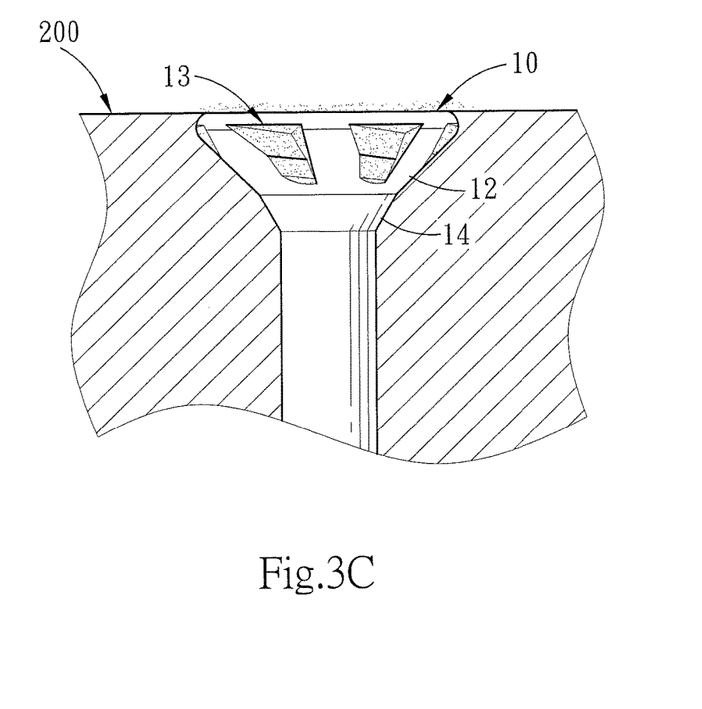

Each of the plurality of recesses 13 includes a crumb guiding end 131 located at a position with a smallest of the recess depths, a cutting end 132 away from the crumb guiding end 131 and located at a position with the smallest of the recess depths, a first accommodating groove 133 located between the cutting end 132 and the crumb guiding end 131 and adjacent to the top portion 11, and a second accommodating groove 134 located between the cutting end 132 and the crumb guiding end 131, adjacent to the first accommodating groove 133 and away from the top portion 11. The recess depth of the first accommodating groove 133 is greater than that of the second accommodating groove 134. In this embodiment, a first plane 1331 is formed at a bottom portion of the first accommodating groove 133, a second plane 1341 is formed at a bottom portion of the second accommodating groove 134, and an obtuse angle is included between the first plane 1331 and the second plane 1341. Referring to FIG. 3A, FIG. 3B and FIG. 3C, during the tapping and fastening process, the cutting end 132 peels and cuts wood fiber at an edge of a drill hole and produces wood crumbs (or plastic crumbs, depending on the object 200). As the wood crumbs enter the second accommodating groove 134 having a smaller capacity, the wood crumbs, under a reactionary force of the screwing, are moved along the first plane 1331 and the second plane 1341 towards the first accommodating groove 133 having a larger capacity, eliminating the crumbs and preventing cracking and damaging of the wood.

Each of the plurality of recesses 13 further includes a third accommodating groove 135 located between the cutting end 132 and the crumb guiding end 131, adjacent to the second accommodating groove 134 and away from the first accommodating groove 133. The recess depth of the second accommodating groove 134 is greater than that of the third accommodating groove 135. A third plane 1351 is formed at a bottom portion of the third accommodating groove 135. An obtuse angle is included between the third plane 1351 and the second plane 1341. The third accommodating groove 135 serves as a buffer for the wood crumbs before the wood crumbs enter the second accommodating groove 134, and is placed at a steeper inclined angle at a lower end of the screw head 10 after the tapping process is completed, thus reducing the reactionary force of the object 200 upon the screw head 10 after tapping and fastening.

Parts of the cutting end 132 and the crumb guiding end 131 corresponding to the first accommodating groove 133 are shifted towards the tapping direction 50. In this embodiment, the amount of shift of the cutting end 132 is smaller, and so the drill hole is not affected by high impulsive pressure during the tapping and fastening process is thus free from the issue of material cracking and damaging. The amount of shift of the crumb guiding end 131 is more significant, such that a longer distance is provided for the wood crumbs to be evenly distributed without accumulating the wood crumbs at partial areas of the plurality of recesses 13.

In conclusion, accommodating groove structures in multiple layers and having different inclined angles are provided on the screw head 10 of the present invention, such that waste crumbs generated during a tapping and fastening process can be accommodated in these accommodating grooves, and reinforcement is also provided after the tapping and fastening process. Further, during the process of tapping and fastening, a crumb discharging channel is provided to disperse the crushing stress between the object 200 and the screw.

What is claimed is:

1. A self-tapping screw head structure comprising a screw head, a rod connected to the screw head, a cone connected to one end of the rod away from the screw head, and a thread extending from the cone to the rod, a direction of the thread surrounding the cone and the rod determining a tapping direction surrounding the screw head and forming a circumferential path; wherein the improvement comprises:

the screw head comprises a top portion, a first neck portion connected to the top portion and having a circumference gradually decreasing towards away from the top portion, a plurality of recesses recessed at a surface of the first neck portion and having recess depths gradually decreasing along the tapping direction, and a second neck portion connected to the first neck portion and having a circumference gradually decreasing towards away from the first neck portion;

wherein, each of the plurality of recesses comprises a crumb guiding end located at a position with a smallest of the recess depths, a cutting end away from the crumb guiding end and having the smallest of the recess depths, a first accommodating groove located between the cutting end and the crumb guiding end and adjacent to the top portion, and a second accommodating groove located between the cutting end and the crumb guiding end, adjacent to the first accommodating groove and away from the top portion, a recess depth of the first accommodating groove being greater than that of the second accommodating groove.

2. The self-tapping screw head structure of claim 1, wherein a first plane is formed at a bottom portion of the first accommodating groove, a second plane is formed at a bottom portion of the second accommodating groove, and an obtuse angle is included between the first plane and the second plane.

3. The self-tapping screw head structure of claim 2, wherein each of the plurality of recesses further comprises a third accommodating groove located between the cutting end and the crumb guiding end, adjacent to the second accommodating groove and away from the first accommodating groove, and the recess depth of the second accommodating groove is greater than that of the third accommodating groove.

4. The self-tapping screw head structure of claim 3, wherein a third plane is formed at a bottom portion of the third accommodating groove, and an obtuse angle is included between the third plane and the second plane.

5. The self-tapping screw head structure of claim 1, wherein a decreasing rate of the circumference of the first neck portion is greater than that of the circumference of the second neck portion.

6. The self-tapping screw head structure of claim 1, wherein a length of the first neck portion is longer than that of the second neck portion.

7. The self-tapping screw head structure of claim 1, wherein parts of the cutting end and the crumb guiding end corresponding to the first accommodating groove are shifted towards the tapping direction.

* * * * *